United States Patent [19]

Tawara et al.

[11] 4,375,996

[45] Mar. 8, 1983

[54] RARE EARTH METAL-CONTAINING ALLOYS FOR PERMANENT MAGNETS

[75] Inventors: Yoshio Tawara; Tetsuichi Chino; Ken Ohashi, all of Takefu, Japan

[73] Assignee: Shin-Etsu Chemical Co., Ltd., Tokyo, Japan

[21] Appl. No.: 265,367

[22] Filed: May 20, 1981

[30] Foreign Application Priority Data

May 23, 1980 [JP] Japan ................................ 55-68546

[51] Int. Cl.$^3$ ................................ C04B 35/00

[52] U.S. Cl. ................................ 148/31.57; 420/582

[58] Field of Search ............ 148/31.57; 75/170, 134 F

[56] References Cited

U.S. PATENT DOCUMENTS

| | | | |
|---|---|---|---|
| 3,540,945 | 11/1970 | Strnat et al. | 75/170 |
| 4,211,585 | 7/1980 | Inomata et al. | 75/170 |
| 4,213,803 | 7/1980 | Yoneyama et al. | 75/170 |
| 4,284,440 | 8/1981 | Tokunaga et al. | 148/31.57 |
| 4,289,549 | 9/1981 | Kasai | 148/31.57 |

*Primary Examiner*—John P. Sheehan

*Attorney, Agent, or Firm*—Toren, McGeady and Stanger

[57] ABSTRACT

The invention provides a rare earth metal-containing alloy for permanent magnets having a composition expressed by the formula $$Sm_{1-\alpha}Ce_{\alpha}(Co_{1-x-y-u-v-w}Fe_xCu_yTi_uZr_vMn_w)_z,$$

in which the suffixes are each a numerical value as defined by:

$0.1 \leqq \alpha \leqq 0.90$;
$0.10 \leqq x \leqq 0.30$;
$0.05 \leqq y \leqq 0.15$;
$0.002 \leqq u \leqq 0.03$;
$0.002 \leqq v \leqq 0.03$;
$0.005 \leqq w \leqq 0.08$;

with the proviso that $0.01 \leqq u+v+w \leqq 0.10$; and $5.7 \leqq z \leqq 8.1$. The permanent magnets prepared with the alloy have very high magnetic properties, especially, in the coercive force and the maximum energy product even better than those obtained with a samarium-based alloy along with good machinability as in the cerium-based alloys suitable for mass production.

1 Claim, 1 Drawing Figure

FIGURE
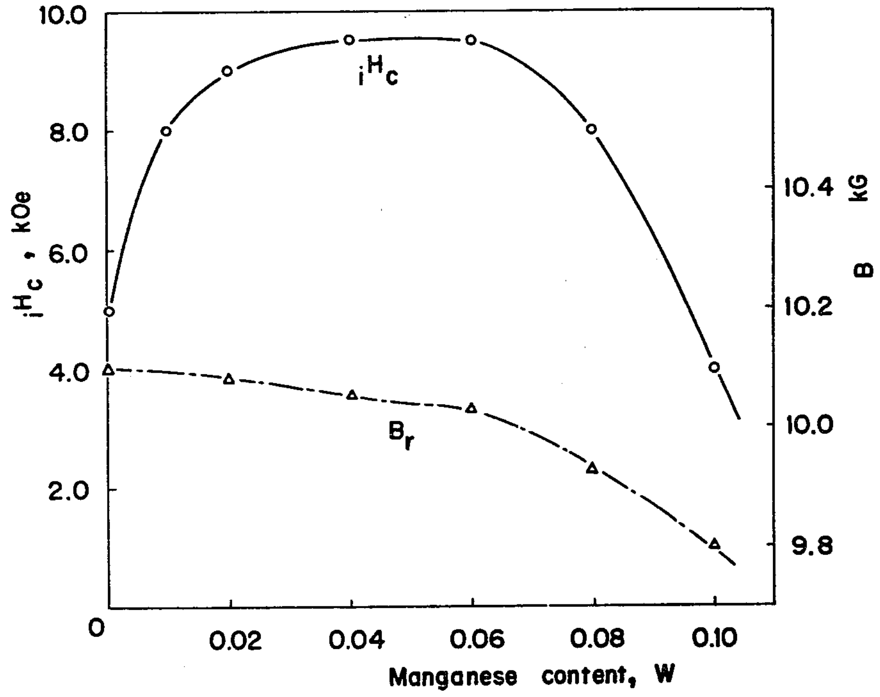

RARE EARTH METAL-CONTAINING ALLOYS FOR PERMANENT MAGNETS

BACKGROUND OF THE INVENTION

The present invention relates to a novel rare earth metal-containing alloy for permanent magnets. More particularly, the invention relates to a rare earth metal-containing alloy for permanent magnets of which the rare earth metal constituent is composed of a combination of samarium and cerium as combined with cobalt as the main component of the transition metal constituent partially replaced with iron and copper.

In the prior art, there have widely been undertaken many investigations on the rare earth metal-containing alloys for permanent magnets of the type $(Sm, Ce)(Co, Fe, Cu)_z$ as a modification obtained by partial substitution of cerium for samarium and iron and copper for cobalt in the prototypical alloys of $SmCo_z$. See, for example, (a) IEEE Trans. Mag., volume Mag-10, page 313 (1974) and (b) Japan. Journal of Appl. Phys., volume 12, page 761 (1973). The highest value of the maximum energy product $(BH)_{max}$, which is the most representative parameter for the magnet performance, is 20.2 MGOe as is reported in the reference (b) above.

On the other hand, it is already known that, for the magnet alloys expressed by the formula $Sm(Co, Fe, Cu)_z$ or $Ce(Co, Fe, Cu)_z$, addition of a transition metal such as titanium, zirconium, manganese, hafnium and the like is effective in increasing the coercive force of the magnet so that the content of the iron as well as the relative amounts of the non-rare earth metals to the rare earth metal as represented by the suffix z can be made larger contributing to the increase of the saturation magnetization. See, for example, (c) Japan. Journal of Appl. Phys., volume 17, page 1993 (1978) teaching the addition of titanium to a samarium-based magnet alloy; (d) IEEE Trans. Mag., volume Mag-13, Page 1317 (1977) teaching the addition of zirconium to a samarium-based magnet alloy; (e) Japanese Patent Publication 54-33213 issued 1979 teaching the addition of manganese to a samarium-based magnet alloy; and (f) Appl. Phys. Lett., volume 30, page 669 (1977) teaching the addition of titanium to a cerium-based magnet alloy.

Among the permanent magnet alloys disclosed in the above given references, those with samarium as the rare earth metal constituent are superior by far to the cerium-based ones in many of the magnetic characteristics. Unfortunately, samarium metal is very expensive in comparison with cerium metal so that there have been made several attempts to replace part of the samarium with less expensive cerium metal with an object to improve the magnetic properties of the magnet alloys containing the binary rare earth metal constituent of samarium and cerium by the admixture of any one of the transition metals of titanium, zirconium, manganese and the like as a partial replacement of the non-rare earth constituent of cobalt, iron and copper. See, for example, (g) Japanese Patent Publication 53-2127 issued 1978 teaching the addition of manganese to an alloy of the type $(Sm, Ce)(Co, Cu)_z$; (h) Japanese Patent Publication 54-38973 issued 1979 teaching the addition of titanium to an alloy of the type $(Sm, Ce) Co, Cu)_z$; and (i) Fourth Int. Workshop on RE.Co Permanent Magnets, page 387 (1979) teaching the addition of zirconium to an alloy of $(Sm, Ce)(Co, Fe, Cu)_z$. The highest value of the maximum energy product of the permanent magnets disclosed in these references cannot exceed 19.8 MGOe as is shown in the last given reference.

Accordingly, there has been eagerly desired to improve the magnetic properties of the alloys of the type $(Sm, Ce)(Co, Fe, Cu)_z$ with respect to the coercive force and the squareness of the hysteresis loop with a consequent increase in the value of the maximum energy product even with less strictly defined consitions for the thermal treatments including sintering and aging.

SUMMARY OF THE INVENTION

The permanent magnet alloy provided by the present invention has a composition expressed by the formula $$Sm_{1-\alpha}Ce_{\alpha}(Co_{1-x-y-u-v-w}Fe_xCu_yTi_uZr_vMn_w)_z,$$

in which the suffixes are each given by the following equation:

$0.1 \leqq \alpha \leqq 0.90$;
$0.10 \leqq x \leqq 0.30$;
$0.05 \leqq y \leqq 0.15$;
$0.002 \leqq u \leqq 0.03$;
$0.002 \leqq v \leqq 0.03$;
$0.005 \leqq w \leqq 0.08$;
with the proviso that $0.01 \leqq u+v+w \leqq 0.10$; and
$5.7 \leqq z \leqq 8.1$.

BRIEF DESCRIPTION OF THE DRAWING

The FIGURE shows the coercive force ${}_iH_c$ and residual magnetization $B_r$ as a function of the manganese content w in the parmanent magnet alloys expressed by the formula $$Sm_{0.7}Ce_{0.3}(Co_{0.71-w}Fe_{0.16}Cu_{0.12}Ti_{0.005}Zr_{0.005}Mn_w)_{6.9}.$$

DETAILED DESCRIPTION OF THE PREFERRED EMBODIMENTS

Provided that the above given composition or proportion of the individual elements is satisfied, the permanent magnet alloys of the invention have no further limitation and can be obtained by any conventional methods for manufacturing rare earth metal-containing permanent magnet alloys. Most conveniently, shaped bodies of the inventive permanent magnet alloy are prepared by the powder metallurgical process including compression molding in a magnetic field. Typical procedures for the preparation are as follows.

The individual component metals, i.e. samarium, cerium, cobalt, iron, copper, titanium, zirconium and manganese, are taken by weight to satisfy the proportions among them in compliance with the desired composition of the alloy and melted together in an alumina crucible by induction heating in a vacuum furnace. The melt of the alloy is then cast into an iron mold cooled with water to give an ingot.

The ingot is first crushed into coarse particles in a pulverizing machine such as Brown mills and then finely pulverized in a jet mill with a nitrogen jet stream to give an average particle diameter of 1 to 5 $\mu$m. The finely pulverized alloy is placed in a metal mold and compression-molded under a pressure of about 1000 kg/cm$^2$ in a magnetic filed of, for example, 10 kOe so as that each of the alloy particles has its axis of easy magnetization aligned in the direction of the magnetic filed.

The shaped body obtained by the above compression molding is subjected to sintering in vacuum at a temperature of 1050° to 1250° C. or, preferable, 1120° to 1200° C. for a sufficiently long duration, say, for 1 hour. After cooling, the sintered body is again heated at a temperature of 1050° to 1200° C. or, preferably, at about 1100° C. effect solution treatment for about 1 hour followed, after cooling to room temperature, by the aging treatment at a temperature of 400° to 900° C. or, preferably, 700° to 800° C. for 2 to 20 hours and then cooling to room temperature taking 7 hours or longer. The particular conditions of the temperature and time in the aging treatment should be determined so as that the thus obtained permanent magnet has a highest value of the coercive force.

The features of the present invention may be summarized as follows.

(1) It is essential in the present invention that the magnet alloy containes titanium, zirconium and manganese as combined to satisfy the above formula of composition so that the magnet has a very high coercive force of 8 to 10 kOe along with an improved squareness ratio expressed by $(BH)_{max}/(B_r/2)^2$, where $(BH)_{max}$ is the maximum energy product and $B_r$ is the residual magnetization, when properly processed.

On the contrary, a similar permanent magnet alloy obtained by the single addition of titanium or zirconium alone has a relatively low coercive force of 5 to 7 kOe with a poor squareness ratio. Further, the squareness ratio may be only slightly improved by the binary addition of a combination of titanium and manganese or zirconium and manganese with the coercive force kept at approximately the same level as in the single addition of titanium or zirconium.

(2) Marked improvement is obtained in the value of the maximum energy product. For example, a value as high as 27 MGOe is obtained with an alloy in which 10 atomic % of samarium is replaced with cerium. This is a noteworthy improvement over the highest value of 20.2 MGOe obtained with a conventional samarium-cerium based alloy.

(3) Mechanical working, e.g. cutting and grinding, of the inventive permanent magnet alloys is easier than with conventional samarium-based magnet alloys containing no cerium. Accordingly, advantages are obtained in the improved working efficiency and increased yield of the finished products.

In the following, the present invention is described in further detail by way of example.

Example 1. (Experiments No. 1 to No. 11)

Rare earth metal-containing permanent magnet alloys were prepared according to the procedure given above, each having a composition expressed by the formula $$Sm_{0.7}Ce_{0.3}(Co_{0.72-u-v-w}Fe_{0.16}Cu_{0.12}Ti_uZr_vMn_w)_{6.9}$$

with varied values of the suffixes u, v and w as indicated in Table 1 below. The magnetic properties of these alloys, i.e. residual magnetization $B_r$ in KG, coercive force $_iH_c$ in kOe, maximum energy product $(BH)_{max}$ in MGOe and squareness ratio as described before, were measured to give the results shown in Table 1.

In the experiments shown in the table, Experiments No. 1 to No. 6 are for the comparative purpose with the cases where one, two or all of titanium, zirconium and manganese were omitted from the alloy composition. When none of them was added, the resultant magnet has a relatively small coercive along with a poor squareness ratio. When either one of them was added to the composition, a slight improvement was obtained in the coercive force of the magnet whereas no noticeable improvement was obtained in the squareness ratio of the hysteresis loop. Binary addition of a combination of titanium and manganese or zirconium and manganese is effective in the improvement of the coercive force to about the same extent as in the single addition with somewhat improved squareness ratio.

TABLE 1

| Experiment No. | u | v | w | $B_r$, KG | $_iH_c$, kOe | $(BH)_{max}$, MGOe | Squareness ratio |
|---|---|---|---|---|---|---|---|
| 1* | 0 | 0 | 0 | 10.3 | 2.0 | 10.9 | 0.41 |
| 2* | 0.01 | 0 | 0 | 10.0 | 4.8 | 14.0 | 0.56 |
| 3* | 0 | 0.01 | 0 | 10.1 | 5.2 | 16.7 | 0.65 |
| 4* | 0 | 0 | 0.02 | 10.2 | 5.0 | 18.4 | 0.71 |
| 5* | 0.01 | 0 | 0.02 | 9.9 | 5.4 | 19.2 | 0.78 |
| 6* | 0 | 0.01 | 0.02 | 10.0 | 5.9 | 20.0 | 0.80 |
| 7 | 0.005 | 0.005 | 0.02 | 10.0 | 9.0 | 24.2 | 0.97 |
| 8 | 0.002 | 0.002 | 0.02 | 10.1 | 7.5 | 23.1 | 0.90 |
| 9 | 0.01 | 0.01 | 0.02 | 9.8 | 8.6 | 22.4 | 0.93 |
| 10 | 0.02 | 0.02 | 0.02 | 9.3 | 6.5 | 21.0 | 0.97 |
| 11* | 0.05 | 0.05 | 0.02 | 8.5 | 3.8 | 15.0 | 0.83 |

*Comparative experiment

On the other hand, combined addition of titanium, zirconium and manganese is very effective as is shown by Experiments No. 7 to No. 10 in both respects of increasing the coercive force up to 9 kOe and improving the squareness ratio of the hysteresis loop with a very high value of the maximum energy product of 24.2 MGOe as a consequence. Although the combined addition of these three elements is effective, too much amounts of them is disadvantageous as is evidenced by Experiment No. 11 in which the total of u+v+w was as high as 0.12 with markedly decreased magnetic properties as is shown in the table.

Example 2

A series of permanent magnet alloys were prepared each having a composition expressed by the formula $$Sm_{0.7}Ce_{0.3}(Co_{0.71-w}Fe_{0.16}Cu_{0.12}Ti_{0.005}Zr_{0.005}Mn_w)_{6.9}$$

with varied values of w and the residual magnetization $B_r$ and coercive force $_iH_c$ of the magnets were measured to give the results as plotted in the accompanying FIGURE taking the amount of manganese, w, as the abscissa. As is clear from the FIGURE, the coercive force had a maximum at about w=0.06 while the residual magnetization decreased steadily with the increase of the manganese content over 0.06 although superior magnets to the conventional ones could be obtained in the range where w was smaller than 0.09, i.e. u+v+w was smaller than 0.10.

Example 3. (Experiments No. 12 to No. 21)

A series of permanent magnet alloys according to the invention were prepared (Experiments No. 12 to No. 16) each having a composition expressed by $Sm_{1-\alpha}Ce_\alpha(Co_{0.97-x-y}Fe_xCu_yTi_{0.005}Zr_{0.005}Mn_{0.02})_z$ with varied values of α, x, y and z as indicated in Table 2 below.

In parallel, several comparative magnet alloys were prepared either with omission of titanium, zirconium or manganese (Experiments No. 18 to No. 21) or with addition of zirconium alone among them in an amount to give a value of v equal to 0.01 (Experiment No. 17) with varied values of α, x, y and z indicated in Table 2.

The magnetic properties of these magnet alloys are summarized in the table.

TABLE 2

| Experiment No. | $\alpha$ | x | y | z | $B_r$, KG | $_iH_c$, kOe | $(BH)_{max}$, MGOe | Squareness ratio |
|---|---|---|---|---|---|---|---|---|
| 12 | 0.5 | 0.17 | 0.13 | 6.5 | 9.4 | 7.8 | 21.0 | 0.95 |
| 13 | 0.35 | 0.17 | 0.13 | 6.7 | 9.8 | 8.6 | 22.9 | 0.95 |
| 14 | 0.25 | 0.18 | 0.12 | 6.9 | 10.4 | 9.1 | 25.5 | 0.94 |
| 15 | 0.2 | 0.18 | 0.115 | 7.1 | 10.7 | 9.5 | 20.4 | 0.92 |
| 16 | 0.1 | 0.18 | 0.115 | 7.1 | 10.8 | 10.0 | 27.0 | 0.93 |
| 17*[a] | 0.56 | 0.16 | 0.13 | 6.2 | 9.0 | 7.8 | 19.4 | 0.96 |
| 18* | 0.35 | 0.05 | 0.15 | 7.0 | 8.5 | 6.05 | 16.5 | 0.91 |
| 19* | 0.25 | 0.04 | 0.15 | 7.2 | 9.2 | 5.2 | 20.2 | 0.95 |
| 20* | 0.2 | 0.05 | 0.14 | 7.2 | 9.7 | 4.85 | 20.0 | 0.85 |
| 21* | 0.1 | 0.05 | 0.16 | 7.2 | 8.35 | 6.5 | 16.6 | 0.95 |

*Comparative experiment (see text).
[a]Zirconium was added (v = 0.01).

In addition to the outstandingly superior magnetic properties, especially, in the coercive force and maximum energy product, the permanent magnets prepared with the inventive alloy have good machinability as those prepared with a cerium-based alloy known to have much better machinability than those with a samarium-based alloy even when the inventive alloy containes only 10 atomic % of cerium in the rare earth metal component (Experiment No. 16). Therefore, the permanent magnets prepared with the inventive alloy have great advantages also in the very much increased velocity of mechanical working such as cutting and grinding as well as in the improvement of the yield of products owing to the reduced breaking and chipping during mechanical working bringing about a large increase in the production costs of the finished magnet products.

What is claimed is:

1. A rare earth metal-containing alloy for permanent magnets having a composition expressed by the formula $$Sm_{1-\alpha}Ce_{\alpha}(Co_{1-x-y-u-v-w}Fe_xCu_yTi_uZr_vMn_w)_z,$$

wherein the subscripts are each a numerical value as defined by:

$0.1 \leqq \alpha \leqq 0.90$;
$0.10 \leqq x \leqq 0.30$;
$0.05 \leqq y \leqq 0.15$;
$0.002 \leqq u \leqq 0.03$;
$0.002 \leqq v \leqq 0.03$;
$0.005 \leqq w \leqq 0.08$, with the proviso that $0.01 \leqq u+v+w \leqq 0.10$; and $5.7 \leqq z \leqq 8.1$.

* * * * *